(No Model.)
W. O. WEBBER.
STUFFING BOX.
No. 331,014. Patented Nov. 24, 1885.
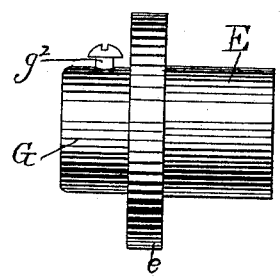
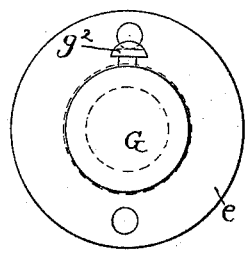
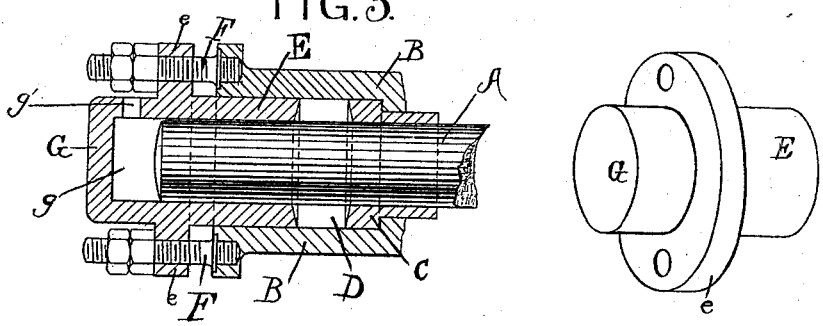
WITNESSES.
INVENTOR.
William O. Webber
by his atty
Clark & Raymond

UNITED STATES PATENT OFFICE.

WILLIAM O. WEBBER, OF LAWRENCE, MASSACHUSETTS.

STUFFING-BOX.

SPECIFICATION forming part of Letters Patent No. 331,014, dated November 24, 1885.

Application filed September 28, 1885. Serial No. 178,376. (No model.)

*To all whom it may concern:*

Be it known that I, WILLIAM O. WEBBER, of Lawrence, in the county of Essex and State of Massachusetts, a citizen of the United States, have invented a new and useful Improvement in Stuffing-Boxes, of which the following is a full, clear, and exact description, reference being had to the accompanying drawings, forming a part of this specification, in explaining its nature, in which—

Figure 1 is a plan view thereof. Fig. 2 is a vertical section, and Fig. 3 an elevation.

The invention is especially adapted for use upon a centrifugal pump known as the "Webber" pump, manufactured by the Lawrence Machine Company, of Lawrence, Massachusetts, although I do not confine myself to its use in connection with said pump, as it possesses features which render it desirable for general use.

The objects of the invention are, first, to provide means for holding the packing in place without tightly compressing it, and also so as to prevent the passage of air along the shaft to the pump; second, to provide the packing and shaft with a constant supply of lubricating material; third, to protect the ends of the bolts by which the cap is fastened in place; and, fourth, to protect the end of the shaft.

Referring to the drawings, A represents the shaft. B represent the box through which the shaft passes, and which holds the journal or bearing C, the packing D, and the sleeve E, which holds the packing in place. These parts are not new, and it has been the practice heretofore to compress the packing D about the shaft very solidly by means of the bolts F, which pass through the flange $e$ of the sleeve.

Instead of making the sleeve E open at its end, as heretofore, I have formed at its end, substantially as represented in the figures, an extension, G, which forms a cap, and a chamber, $g$. I have also arranged a passage, $g'$, to the chamber, which is closed by the screw-plug $g^2$. This cap, when closed by the plug, prevents the passage of air along the shaft, and therefore makes it unnecessary to press the packing D as tightly as if the end of the shaft were exposed to the air.

The chamber $g$ may be used for holding a supply of lubricating material, by which the shaft and bearings may be constantly lubricated. The cap also protects the end of the shaft from injury, or from being knocked up or burred, and this feature is very desirable in centrifugal pumps, because they are often subjected to very hard usage, and if the end of the shaft becomes burred up by hard usage an uncapped sleeve cannot be readily removed.

Heretofore the fastening-bolts have extended beyond the end of the shaft, and have received more or less injury because of the exposed position. With the cap, however, they are protected, because they do not extend beyond its outer surface, and the cap acts as a buffer and guard and receives the hard usage which otherwise would be received by the bolts and end of the shaft.

Having thus fully described my invention, I claim and desire to secure by Letters Patent of the United States—

1. In a stuffing-box, the gland-sleeve E, provided with the cap G, as and for the purposes described.

2. The combination, in a stuffing-box, of the bearing C, the cap G, having the follower or gland E, and the chamber $g$, all substantially as described.

3. The combination of the shaft A and the gland-sleeve E, having the cap G, all substantially as described.

4. The combination of the shaft A, the gland-sleeve E, having the cap G, and chamber $g$, substantially as described.

5. The combination of the shaft A, the gland-sleeve E, the cap G, having the hole $g'$, and the screw-plug $g$, substantially as described.

WILLIAM O. WEBBER.

Witnesses:
HIRAM L. MELLOR,
ROBERT WAINWRIGHT.